May 22, 1962

E. K. KARLSSON 3,035,390

CENTER DIVIDER FOR CORN PICKERS

Filed Dec. 7, 1959

INVENTOR.
Elof K. Karlsson
BY
Atty.

3,035,390
CENTER DIVIDER FOR CORN PICKERS
Elof K. Karlsson, Moline, Ill., assignor to International Harvester Company, Chicago, Ill., a corporation of New Jersey
Filed Dec. 7, 1959, Ser. No. 857,942
5 Claims. (Cl. 56—119)

This invention relates to a new and improved center divider for corn pickers.

A center divider or crop raising and deflecting means for corn pickers performs two functions; (1) that of shielding or forming a guard or shroud for the tractor front wheels and (2) that of guiding material into a corn harvesting mechanism. Center dividers have been made in two ways to cover the steerable front wheels of tricycle type farm tractors. The divider is made either to mount onto the turning mechanism for the front wheels so that the divider turns with the front steerable wheels or is made to mount on the tractor and be sufficiently large to permit the turning of the steerable wheels therewithin.

It is therefore a principal object of this invention to provide a center divider for corn pickers in which the divider is relatively narrow in width and is not mounted on the steerable wheels and yet permits full turning of the dirigible tractor wheels within the center divider.

Another important object of this invention is the provision of aperture means in the sides of a center divider for corn pickers whereby steerable tractor wheels may be turned throughout a full 360° by reason of the apertures in the sides of the divider and yet the divider is capable of guiding and deflecting standing or down corn stalks into the rearwardly disposed corn harvester.

Another and further important object of this invention is to supply a center divider for corn pickers with side apertures and a forwardly disposed point member to guide and deflect stalks around the steerable wheels.

Still another important object of this invention is to equip a center divider with an auxiliary gatherer point formed at the rear of side apertures in the divider and the auxiliary gatherer point spaced only slightly outwardly from a forwardly disposed central section of the center divider.

A still further important object of this invention is to provide a center divider for corn pickers in which a point portion of the divider disposed forwardly of the steering wheels of the tractor is provided with a vertically adjustable curtain to prevent overriding of stalks.

Other and further important objects and advantages will become apparent from the disclosures in the following specification and accompanying drawings.

Figure 1:
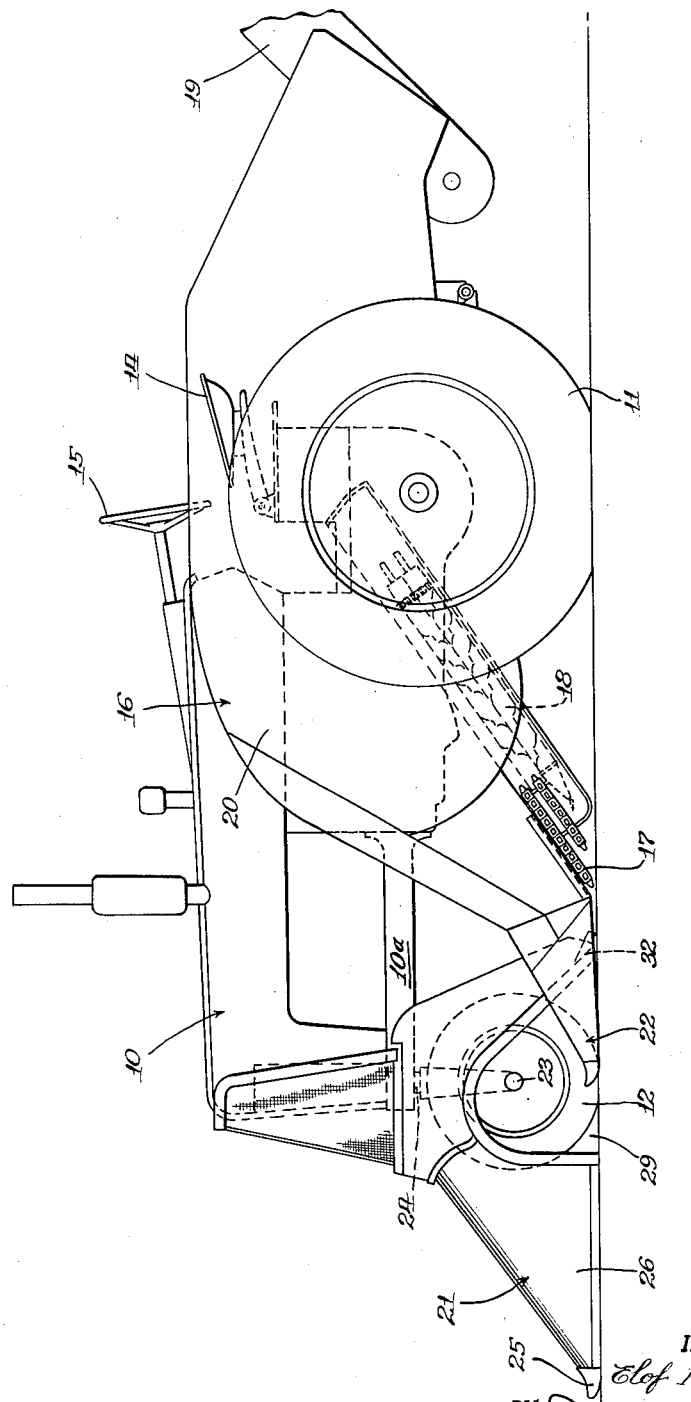
FIGURE 1 is a side elevational view of a tractor mounted corn picker employing the center divider of this invention.

The reference numeral 10 indicates generally a tricycle type agricultural tractor. The tractor is equipped with relatively widely spaced apart rear traction wheels 11 and at the forward end thereof the tractor is equipped with a centrally disposed pair of closely coupled steerable wheels 12 and 13. An operator's seat 14 is provided substantially centrally of the tractor and between the large traction wheels 11. A steering wheel 15 is closely adjacent the operator's seat 14 and permits the operator to effect a steering of the dirigible wheels 12 and 13 as a unit. The other controls for the tractor have not been shown inasmuch as they form no part of the present invention. In other words, this is a conventional farm type tractor and implements are pulled, pushed or mounted thereon to effect various farming operations.

In the present instance, the tractor 10 is arranged and constructed to receive a corn harvester 16 disposed between the narrow longitudinally extending body 10a of the tractor and one of the widely spaced apart rear traction wheels 11. Obviously the corn picker 16 may be duplicated on the other side of the tractor so that two rows of corn may be picked simultaneously. Such two-row corn harvesters are conventional in their attachment on farm tractors of this tricycle type. The corn harvester includes gathering chains 17, cooperative snapping rolls 18 and, among other things, a wagon elevator 19 to carry the harvested corn upwardly and rearwardly for deposit in a trailing wagon or the like. The means for conveying snapped ears of corn from the snapping rolls 18 to the rearwardly mounted wagon elevator 19 is a corn pitching member 20. Further details of the corn harvester employed in this particular device have not been shown or described inasmuch as generally they form no part of the present invention.

It is the purpose of the present invention to improve or enhance the feeding or guiding of standing or down corn stalks into the corn harvester mounted on the tractor as just described.

Figure 2:
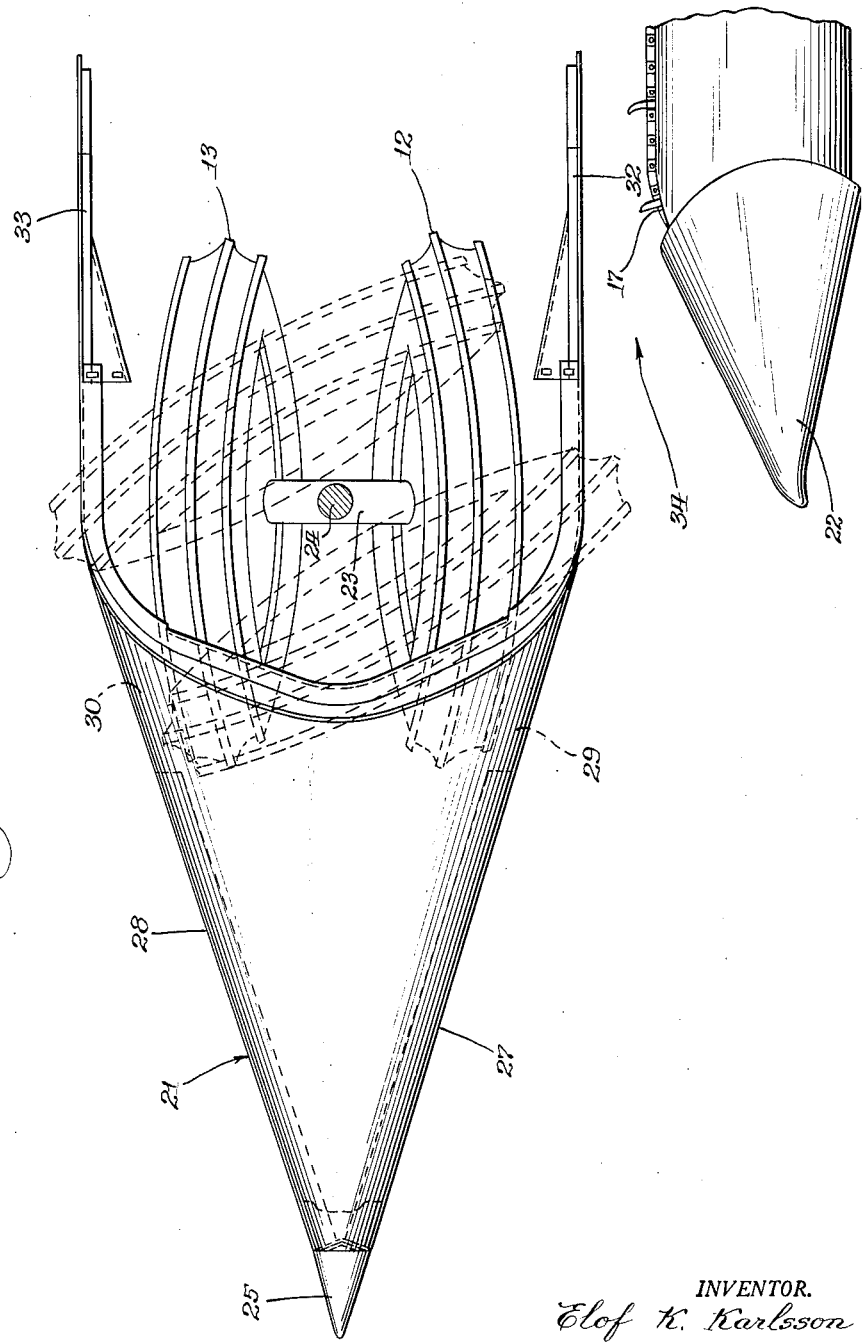
FIGURE 2 is an enlarged fragmentary top plan view looking down at the steerable wheels of the tractor and having a center divider mounted thereon.

The guiding of corn into the corn harvester is accomplished by a crop raising and deflecting means which is commonly called a center divider 21. Further guiding of the corn stalks is accomplished by an outer gatherer point 22. The spaced apart center divider and gatherer point 22 define a longitudinally extending passage through which stalks of corn may be guided into the gathering chains 17 for subsequent ear snapping by the rolls 18. The center divider 21 is generally a shroud or cover for the dirigible wheels 12 and 13 of the tractor 10. The wheels 12 and 13 are mounted on an axle 23 carried on a generally vertically disposed spindle 24. The spindle is rotated by the steering wheel 15 to effect a turning of the dirigible wheels 12 and 13 which steers the tractor 10. In the present instance the center divider 21 is carried directly on the tractor framework and not on the dirigible wheel spindle 24 or the wheel axle 23. Thus the wheels 12 and 13 of the tractor move relative to the center divider 21 upon steering thereof. The center divider 21 has a nose or forwardly extending point portion 25 and an upwardly and rearwardly extending conical shaped housing 26 providing a guide for stalks of corn to be moved to either one side or the other thereof. The top plan view of the center divider 21 as shown in FIGURE 2 clearly indicates the sharpness of the point 25, and the diverging side walls 27 and 28. These side walls 27 and 28 combine to form the conical shaped housing 26 just described.

Notches or cutout portions 29 and 30 in the side walls 27 and 28 are in transverse alignment in the center divider 21 adjacent the steerable wheels 12 and 13 such that when the wheels are turned at a sharp angle the wheel extremities can pass through the cutouts or notches 29 and 30 without the wheels striking the center divider sheet metal housing. This insures that the size of the center divider is not excessive and yet it is sufficiently wide to guide stalks around the wheels 12 and 13 during all periods of picking. However, when the wheels 12 and 13 are turned into the dash line position as shown in FIGURE 2, it is questionable whether any corn picking is actually taking place. The wheels are generally only turned in this extreme position at the end of a row or a corner where the tractor is being turned around to come back an adjacent row or down a row at right angles to the one just picked. The vertical extent of the notches 29 and 30 is such that it exceeds the height of the peripheral portion of the dirigible wheels 12 and 13, which portion extends into the notches upon angular turning of the wheels to the dash line position, as shown in FIGURE 2. The extremities or peripheral portions of the wheels 12 and 13 extend through the apertures 29 and 30 without in any way impairing the stalk guiding function of the center divider.

The rearward end of the gathering member 21 is provided with downwardly and rearwardly extending spaced apart leg members 32 and 33.

In the operation of the device of this invention the tractor mounted corn picker passes through a field of standing corn and whether or not the stalk is standing upright or has been blown down by storms or the like, the forwardly disposed ground-riding center divider 21 will cause the stalks to be picked up and guided around the side walls 27 and 28 whereupon the stalks are delivered past the downwardly opening notches 29 and 30 into a throat portion 34 which is defined as that space between the leg 32 of the center divider 21 and the outer gatherer point 22. The gathering chain 17 engages the stalks when it reaches this point in the machine to thereupon feed the stalk for delivery to the snapping rolls 18. Thus it should be understood that the downwardly opening notches 29 and 30 extending upwardly into the side walls of the center divider permit a considerable narrowing of the usual wide center dividers and yet there is no impairment of the guiding of stalks rearwardly into the corn picker for subsequent treatment.

Figure 3:
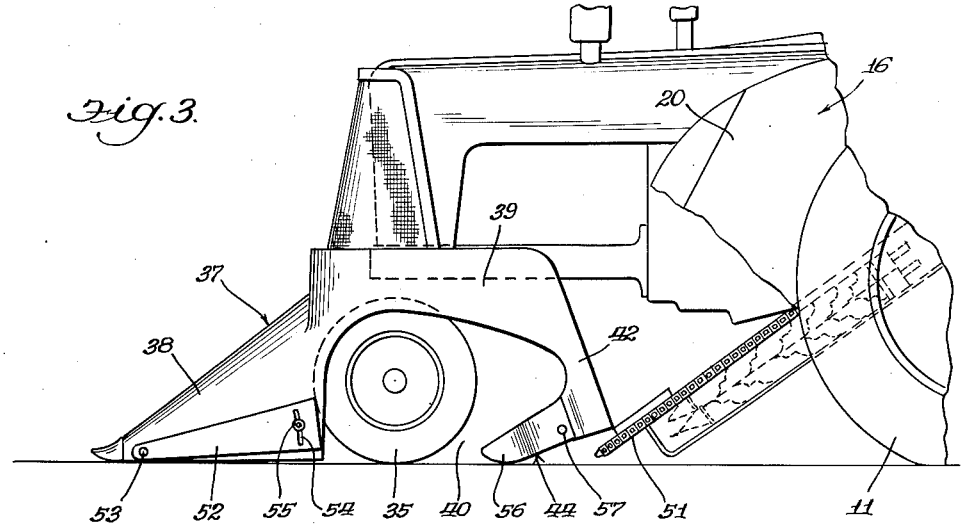
FIGURE 3 is a side elevational view with parts broken away of a modified form of the center divider for corn pickers of this invention.
Figure 4:
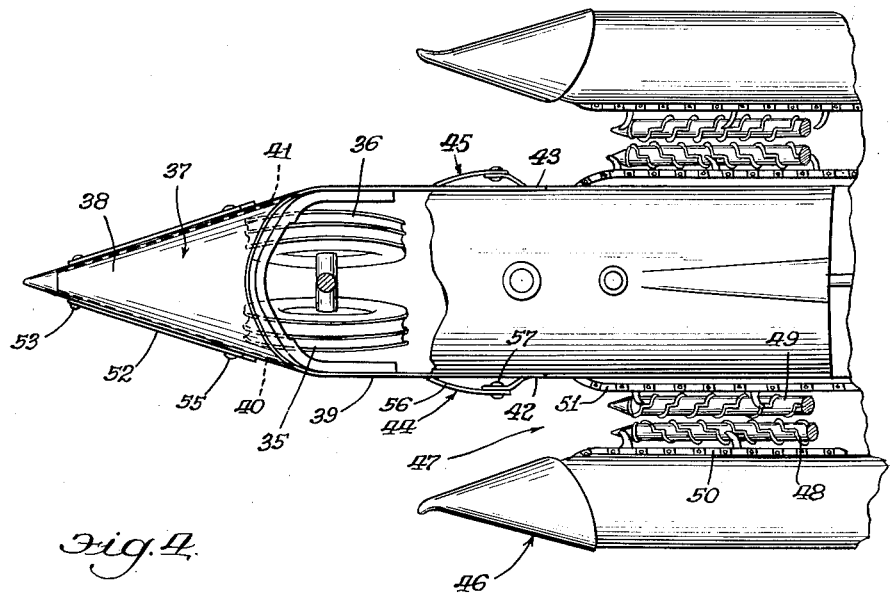
FIGURE 4 is a generally top plan view with parts broken away of the device as shown in FIGURE 3.

In the modified device as shown in FIGURES 3 and 4 there is the same tractor upon which a corn picker is mounted. However, in the modified form of the invention as shown in FIGURES 3 and 4 the center divider and its appurtenances are somewhat different in that auxiliary elements are included. In this modified form the tractor dirigible wheels are designated as 35 and 36 and the center divider is generally designated as 37. The divider 37 includes a forwardly and downwardly extending generally conical-shaped point 38 and the rearward portion thereof includes a shroud or covering 39 for the close coupled steerable wheels 35 and 36 of the tractor. Adjacent the wheels 35 and 36 and in the sides 39 of the divider 37 there are downwardly opening notches 40 and 41 somewhat similar to the downwardly opening notches 29 and 30 of the device as shown in FIGURES 1 and 2. The notches 40 and 41 are for the same purpose as the notches 29 and 30 and permit maximum turning of the dirigible tractor wheels 35 and 36 without physical contact with the center divider 37. Because of this particular construction the center divider 37 contributes to a narrow relatively sleek corn picker capable of dividing rows of corn regardless of how they are either mingled or tangled because of storms or the like.

The rearwardly and downwardly extending arms or members 42 and 43, corresponding to the arms 32 and 33 in the device of FIGURES 1 and 2, terminate in secondary gatherer points 44 and 45. The gatherer points 44 and 45 are bent or turned outwardly from the plane of the arms 42 and 43 so that they guide stalks of corn just laterally outwardly of the wheels 35 and 36 of the tractor. As shown in FIGURE 4 the outer gatherer point 46 is positioned laterally outwardly of the auxiliary or secondary gatherer point 44 and thus at the point of entry of the stalk into the corn harvester (position 47), the stalks are urged inwardly to a point almost on the center line of the corn-growing row which is in alignment with the juncture between the snapping rolls 48 and 49 shown rearwardly of this mouth 47. Outer gatherer chains 50 are disposed within the outer gatherer point 46. To the rear of the secondary gatherer point on the inside of the row, and forming a part of the center divider, there is also provided an inner gatherer chain 51 as shown in FIGURE 4. The cooperative inner and outer gatherer chains 51 and 50 carry the stalks rearwardly into the snapping rolls 48 and 49 whereupon the ears are taken from the stalks and carried through the harvesting machine in the manner shown in FIGURE 1.

Another feature of the modified form of the invention as shown in FIGURES 3 and 4 is the adjustable curtain 52 on the center divider point 38. The curtain is a generally triangular shaped member which is pivoted at its forward end at 53 near the apex of the point 38 and by means of an elongated slot 54 and a bolt or the like 55 passing therethrough and engaging the framework of the center divider the curtain may thus be swung arcuately about its hinge 53 throughout an arc determined by the extent of the elongated slot 54 whereupon the adjustable curtain along each side of the front point may be raised or lowered as desired. The raising of the adjustable curtain prevents overriding of stalks.

The secondary gatherer 44 is provided with a point 56 which is hinged at 57 to permit the gatherer to follow the contour of the ground by riding up or down depending on the contour.

In the operation of the modified form of the invention as shown in FIGURES 3 and 4 the corn picker is driven through a field of standing corn whereupon the corn is guided through and into the harvesting machine by first the center divider and secondly the combined secondary gatherer point on the rear portion of the center divider in cooperation with an outer gatherer point. The downwardly opening notches 40 and 41 permit uninterrupted turning of the tractor dirigible wheels 35 and 36 and the auxiliary or secondary gatherer point insures a proper centering of the stalk on the center line of the row of corn and also the junction centerline of the snapping rolls. Thus when the stalks are fed rearwardly through the machine they are firmly gripped and received by the snapping rolls 48 and 49. This gripping by the snapping rolls is enhanced by reason of the addition of an inner gatherer chain 51 on the center divider to cooperate with an outer gatherer chain 50 normally present in the outer divider 46. This structure insures proper handling of the stalks of corn being harvested with a minimum of width in the center divider which acts as a shroud for the front end of the tractor with its steerable wheels and as a guide for down and offset stalks of corn.

Numerous details of construction may be varied throughout a wide range without departing from the principles disclosed herein and I therefore do not propose limiting the patent granted hereon otherwise than as indicated by the appended claims.

What is claimed is:

1. A crop raising and deflecting means for use in a tricycle type tractor having a narrow longitudinally extending body supported at its front by a narrow steerable wheel structure and at its rear by widely spaced traction wheels, a harvester mounted on said tractor between one traction wheel and the body and having a forwardly extending gathering unit positioned closely adjacent the body of the tractor and terminating adjacent the steerable wheel structure, comprising a shroud forming a part of the harvester and extending around said steerable wheel structure, said shroud extending forwardly and downwardly for closely following the ground and for engaging crops to be harvested and directing them into the path of the gathering unit, said shroud having downwardly opening notches adjacent the steerable wheel structure, said notches being of a height less than the diameter of the steerable wheel structure but greater than the extent of the peripheral portion of said steerable wheel structure which extends into said notches when said steerable wheel structure is turned to its maximum angular displacement, whereby the tractor steerable wheel structure may be turned throughout its maximum range without having physical contact with the shroud.

2. A device as set forth in claim 1 in which the shroud defines downwardly and rearwardly projecting side arms.

3. A device as set forth in claim 2 in which the downwardly and rearwardly projecting arms are provided with secondary gatherer points spaced slightly outwardly from the sides of the shroud.

4. A device as set forth in claim 3 in which the shroud supports inner gatherer chains commencing rearwardly of the secondary gatherer points.

5. A device as set forth in claim 1 in which the shroud is provided with an adjustable curtain along each side of the front thereof.

References Cited in the file of this patent

UNITED STATES PATENTS

| | | |
|---|---|---|
| 1,818,468 | Fickenscher | Aug. 11, 1931 |
| 1,989,368 | Knapp | Jan. 29, 1935 |
| 2,133,905 | Rund | Oct. 18, 1938 |
| 2,473,978 | Van Buskirk | June 21, 1949 |
| 2,613,085 | Haltenberger | Oct. 7, 1952 |
| 2,690,342 | Willey | Sept. 28, 1954 |
| 2,728,184 | Fergason | Dec. 27, 1955 |
| 2,860,476 | Francis et al. | Nov. 18, 1958 |